J. H. STORY & F. C. WINKEL.
WHEEL.
APPLICATION FILED MAY 24, 1907.
953,645.
Patented Mar. 29, 1910.
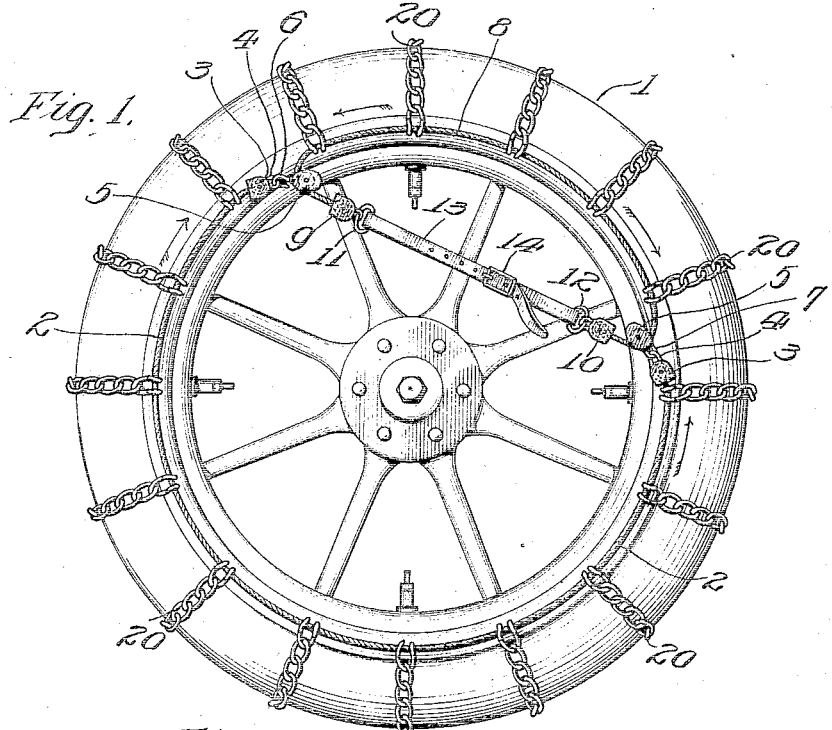
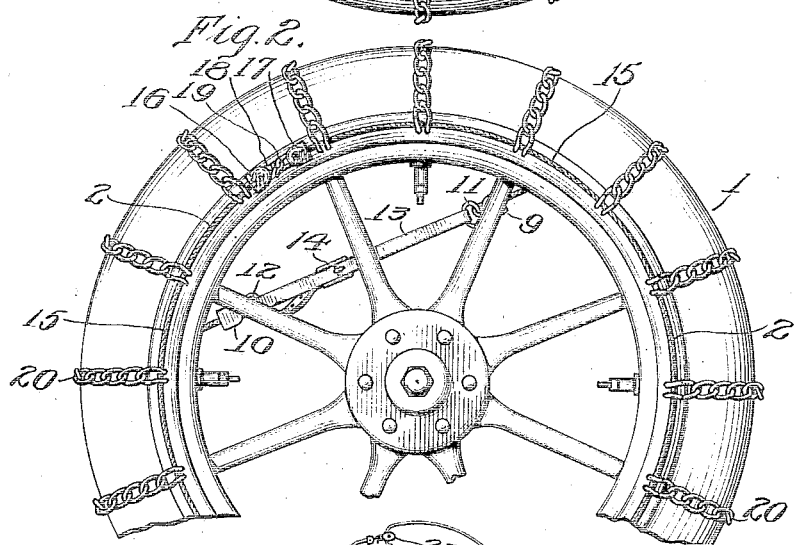
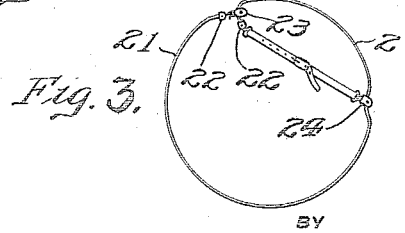
INVENTORS.
John Herbert Story,
Frank Christian Winkel.
WITNESSES
BY
ATTORNEY

UNITED STATES PATENT OFFICE.

JOHN HERBERT STORY AND FRANK CHRISTIAN WINKEL, OF WOODBURY, NEW JERSEY, ASSIGNORS TO HARRY D. WEED, OF SYRACUSE, NEW YORK.

WHEEL.

953,645.  Specification of Letters Patent.  Patented Mar. 29, 1910.

Application filed May 24, 1907. Serial No. 375,404.

*To all whom it may concern:*

Be it known that we, JOHN HERBERT STORY and FRANK CHRISTIAN WINKEL, citizens of the United States, and residents of Woodbury, State of New Jersey, have invented certain new and useful Improvements in Wheels, of which the following is a full, clear, and complete disclosure.

Our invention relates to improvements in wheels, especially adapted for motor vehicles, and the chief object of our invention is to provide a strong, durable and effective anti-skidding device that may be quickly and easily adjusted to, or removed from a wheel over the tire thereof without the use of tools or the need of skilled labor; that when once adjusted will remain in close contact with the wheel and tire without injuring the surfaces of the wheel or tire; and that will operate with practically no noise and with great reliability upon all kinds of surfaces.

With this and other objects in view our invention consists in the novel construction, combination and arrangement of parts hereinafter described and more particularly pointed out in the claims and illustrated in the accompanying drawing, in which Figure 1 is an elevation of one side of a wheel provided with our improved anti-skidding attachment; Fig. 2 a reverse view of the same; and Fig. 3 a diagrammatic view of a modified form of side piece and tensioning device constructed in accordance with this invention.

Referring to the drawings, the device is shown as applied to an automobile wheel of the usual construction, and comprises on one side of the wheel, as shown in Fig. 1, a wire cable 2 extending about two-thirds of the way around the rim of the wheel, and terminating at each end in a clamp 3, provided with an eye 4, as shown in Fig. 1. Connected to each clamp 3 is a pulley 5. One of these pulleys is provided with a hook 6 so that it may be readily detached from its clamp while the other one is secured by means of an eye 7. Through these pulleys extends a second section of cable 8 adapted to complete the circuit of the rim between the pulleys, and the ends of this cable are also provided with clamps 9 and 10 respectively, having rings 11 and 12 passing through the eyes thereof, and a strap 13 provided with a buckle 14 passing through the rings and adapted to tighten the two sections of cable about the rim. Upon the opposite side the wheel is provided a similar piece of cable in one section 15, extending around the rim of the wheel and terminating in cable clamps 16 and 17, one of which is provided with a hook 18, and the other with an eye 19, whereby the ends of the cable are detachably secured together. Between the cable upon one side of the wheel and the cables upon the other extend sections of chain 20, the terminal link of each section being passed over the corresponding section of the cable and the two sections of chain being of such length that when the cables on one side of the wheel are drawn tight by means of the strap 13, the sections of chain will tightly grip the surface of the tire.

We preferably use for this device a style of chain known as curb chain, which has links of a flat type which will not injure the tire. The chain sections may be secured at fixed points upon the cable sections by any suitable means, or may be slipped loosely upon the cables and spaced as desired upon the wheel during the adjustment of the device; however, in any case we preferably leave the section of the chain adjoining the pulleys in loose engagement with the cables so as to provide a more uniform spacing between the chains at these points, as the strap is drawn up or let out through its buckle to provide for wheels and tires of various diameters. By this arrangement the cable upon one side of the wheel is taken up at two points in the periphery of the wheel to tighten the device over the tire, thus distributing the forces as shown by the arrows in Fig. 1, and giving a uniform tension upon the cables and chains throughout the whole periphery of the wheel; furthermore the strap, on account of its elasticity, tends to exert a steady pull upon the cables to take up any tendency to looseness which may arise, owing to any cause whatever.

If preferred, one of the pulleys in this arrangement could be dispensed with, as shown in the diagrammatic view in Fig. 3, and the cable 21 in this case would be made in a single piece, having a clamp 22 at each end thereof, the clamp upon one end of the cable supporting a pulley 23 through which the other end of the cable passes, the clamp on this latter end being attached, as usual, to a ring through which passes the strap, the strap passing also through a ring attached to a clamp 24 directly secured to the cable at a point intermediate of its ends and in the periphery of the wheel corresponding to the location of one of the pulleys in the construction previously described. In this case when the strap is tightened it produces a sag in the cable at the point of its attachment, as is shown in the diagram, and the resulting distribution of forces is similar to that of the construction shown in Fig. 1.

While we have described this invention as being constructed from wire cable, a strap and a certain kind of chain, yet we do not wish to be limited to these particular materials in the construction of this invention, as it is evident that various forms of chain, cable and tightening devices might be substituted for those herein shown and described, and other modification in the details of the construction might be made without departing from the spirit of this invention or the scope of its claims.

Having thus described our invention, what we claim and desire to protect by Letters Patent of the United States is:

1. In an anti-skidding attachment for wheels, a multiple of chains adapted to extend transversely over the tire of the wheel, cables extending through the ends of the chains upon one side of the wheel, one of said cables having pulleys at each end, and one of said pulleys being detachably connected thereto, the other of said cables passing through said pulleys, and a strap connected to the ends of said last mentioned cable for securing the chains to the wheel.

2. In an anti-skidding attachment for wheels, a multiple of chains adapted to extend transversely over the tire of a wheel, a cable connected to the ends of the chains upon one side of the same, a pulley upon each end of said cable, a cable passing through said pulleys, and means connecting the ends of said last mentioned cable to tighten the chains upon the wheel.

3. In an anti-skidding attachment for wheels, a multiple of chains adapted to extend transversely over the tire of a wheel, two co-acting connected cables each connected to the ends of several chains respectively upon one side thereof, and means between the ends of one of said cables to tighten the chains upon the tire.

4. In an anti-skidding attachment for wheels, a multiple of chains adapted to extend transversely over the tire of a wheel, a cable extending through the ends of the chains atone side thereof, additional cables passed through the opposite ends of the chains, one of said additional cables having pulleys at each end through which the ends of the other additional cable are passed, and a strap connecting the ends of said other additional cable for tightening the chains upon the wheel.

5. An anti-skidding attachment for wheels comprising opposite circular sidepieces, cross chains connecting the sidepieces, and an adjustable tensioning device connected at different points to and across the chord of one of the circular side pieces and disconnected from the wheel.

In witness whereof, we have hereunto set our hands this twenty-second day of May, A. D., 1907.

JOHN HERBERT STORY.
FRANK CHRISTIAN WINKEL.

Witnesses:
ADDISON I. GARDNER,
ALEXANDER PARK.